United States Patent [19]

Tanaka

[11] 4,331,985
[45] May 25, 1982

[54] SPLICING-POINT DETECTION APPARATUS AND METHOD

[75] Inventor: Masato Tanaka, Tokyo, Japan

[73] Assignee: Sony Corporation, Tokyo, Japan

[21] Appl. No.: 169,093

[22] Filed: Jul. 15, 1980

[30] Foreign Application Priority Data

Jul. 19, 1979 [JP] Japan ................................ 54-91855

[51] Int. Cl.³ ............................................. G11B 27/02
[52] U.S. Cl. ........................................ 360/13; 360/27
[58] Field of Search ..................... 360/13, 27, 28, 51, 360/73, 14, 37

[56] References Cited

U.S. PATENT DOCUMENTS

| | | | |
|---|---|---|---|
| 3,050,105 | 8/1962 | Dolby | 360/13 |
| 4,037,260 | 7/1977 | Busby, Jr. et al. | 360/14 |
| 4,234,896 | 11/1980 | Onishi et al. | 360/14 |

*Primary Examiner*—Vincent P. Canney
*Attorney, Agent, or Firm*—Lewis H. Eslinger; Alvin Sinderbrand

[57] ABSTRACT

A method and apparatus are provided for detecting a splicing point in a magnetic medium on which a sequence of normally periodic control signals have been recorded. The sequence of control signals is reproduced and a periodic anticipative signal is generated which has an anticipated phase relationship with expected control signals reproduced from the magnetic medium. The phase relationship between the actually reproduced control signals and the anticipative signals is detected and a splicing point is indicated when the detected phase relationship between these two signals deviates by more than a predetermined amount from the anticipated phase relationship.

13 Claims, 15 Drawing Figures

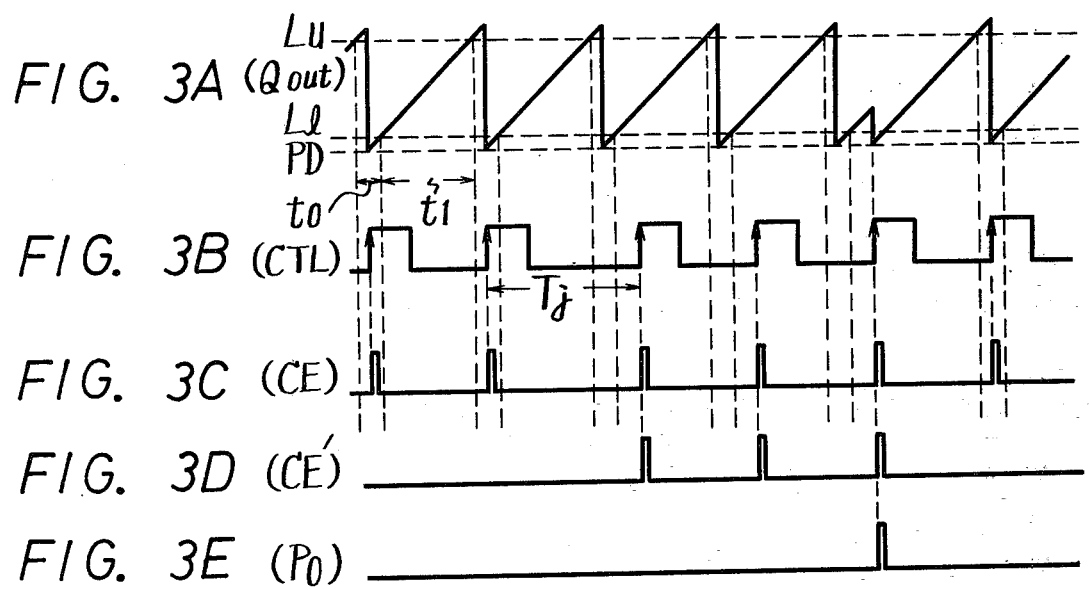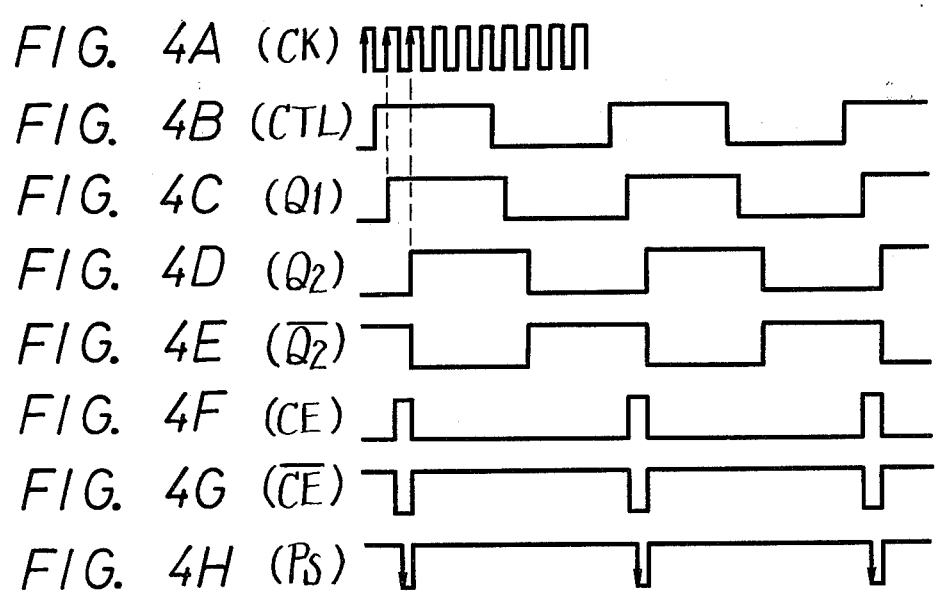

SPLICING-POINT DETECTION APPARATUS AND METHOD

BACKGROUND OF THE INVENTION

1. Field of the Invention

The present invention relates generally to a method and apparatus for detecting a splicing point on a magnetic medium on which control signals are recorded, and is more particularly suitable for use with a magnetic medium on which pulse-code-modulated (PCM) audio signals are recorded.

2. Description of the Prior Art

In one type of PCM recording system, sometimes known as the fixed head system, a PCM signal representing audio information is recorded in one or more information tracks extending along the longitudinal direction of a magnetic tape. Splicing may be performed on tapes recorded with such PCM signals in the same manner that it is performed upon magnetic tapes having standard analog audio signals recorded thereon, that is, by cutting two segments of tape in a direction generally perpendicular to their length and then by abutting the cut ends of the two segments, and fastening them together. To minimize error, it is known to record PCM audio signals in a series of data blocks, each of which includes a plurality of multi-bit information words, an error correcting code word for those information words, and a block synchronizing signal. Each of the information words in the data block may represent an analog signal level or the information word may be formed by multiplexing a specified bit from a plurality of different analog signal levels. The error correcting code within each data block is designed to correct for errors which may occur in the recording and reproducing of the pulse code modulated signals as a result of such factors as dust located upon the magnetic tape, signal noise produced by either the recording or reproducing electronics, or the like.

Unfortunately, the error correcting codes recorded with PCM signals might not provide optimum error correction for reproduction errors caused by or in the immediate vicinity of a splice on the magnetic tape. This is because the error correcting codes used with PCM signals usually have only a limited amount of informational redundancy and, thus may not have the capacity to correct for the amount of erroneous signal reproduction which often occurs in the vicinity of a splicing point. Furthermore, data blocks often are split at a splicing point so that a first incomplete portion of one data block will be connected at the splicing point to a second incomplete portion of another data block. As a result, it is often difficult, if not impossible, to reproduce correctly the audio signal recorded in the two split data blocks at the splicing point. This problem is compounded if the PCM signals within a data block are interleaved. Also, if the splicing of data blocks places data from one data block together with an unrelated error correcting code from another data block, there is a tendency of the reproducing apparatus to use that error correcting code to "correct" data to which it is not related.

As a result of the difficulties in preventing errors in the reproduction of a PCM signal in the vicinity of a splicing point, it has been proposed that a properly reproduced signal level occurring just before the splicing point be stored and used as a continuing signal level until a signal level can be properly reproduced after the splicing point. In accordance with another proposal, the signal level produced prior to the splicing point is faded out and the signal level produced after the splicing point is faded in, so as to provide a more continuous "blend" of reproduced signals, and thus less noticeable signal loss at the splicing point. But, in order for such proposals to succeed, it is necessary that the location of the splicing point be detected accurately. Otherwise, a discontinuity in the signals is reproduced, which will result in the generation of an abnormal sound.

If the magnetic tape is sufficiently wide so as to contain a plurality of parallel longitudinal information tracks thereon, the splicing point can be detected by the presence of reproduction errors occurring in each of such tracks at the very same point. This detection is quite reliable, since a splice is one the few conditions that can cause errors to occur in a line extending all the way across a large number of parallel tracks. But when the width of the magnetic tape is relatively small, such that the tape contains a small number of parallel longitudinal information tracks, it is possible for conditions other than splices, such as scratches or dust upon the magnetic tape, to cause reproduction errors at the very same point in all of the tracks. Therefore, it is desirable to detect splicing points along a magnetic recording medium regardless of the width of that medium.

OBJECTS OF THE INVENTION

Accordingly, it is an object of this invention to provide an improved method and apparatus for detecting a splicing point on a magnetic medium that avoid the above-described difficulties encountered with the prior art.

It is another object of this invention to provide a method and apparatus for detecting a splicing point on a magnetic medium in which the splicing point can be readily detected even if the number of parallel recording tracks in which signals are recorded is relatively small.

It is a further object of this invention to provide a method and apparatus for detecting splicing points on a magnetic medium, even if such splicing points are spaced in close proximity to each other along a recording medium.

It is an additional object of this invention to provide a method and apparatus for detecting a splicing point on a magnetic medium, wherein the presence of splicing points are not falsely indicated as a result of time-base variations in the reproduced signals.

It is yet another object of this invention to provide a method and apparatus for detecting a splicing point on a magnetic medium, wherein the likelihood of false indications as a result of noise, drop-out, or other sources of recording or reproducing errors is minimized.

Various other objects, advantages and features of the present invention will become readily apparent from the ensuing detailed description and the novel features will be particularly pointed out in the appended claims.

SUMMARY OF THE INVENTION

In accordance with one aspect of this invention, a splicing point on a magnetic medium, such as magnetic tape, on which a sequence of normally periodic control signals have been recorded, is detected. A pickup transducer reproduces the sequence of control signals from the magnetic medium, a periodic anticipative signal having an anticipated phase relationship with expected control signals reproduced from the magnetic medium, is generated and the phase relationship of actually reproduced control signals to the anticipative signals is detected. A splicing point is indicated when the detected phase relationship deviates from the anticipated phase relationship by at least a predetermined amount.

BRIEF DESCRIPTION OF THE DRAWINGS

The following detailed description, given by way of example will best be understood in conjunction with the accompanying drawings, in which:

FIGS. 3A-3E and FIGS. 4A-4H are waveform diagrams which are useful in explaining the operation of the embodiment shown in FIG. 2.

DETAILED DESCRIPTION OF A PREFERRED EMBODIMENT

Figure 1:
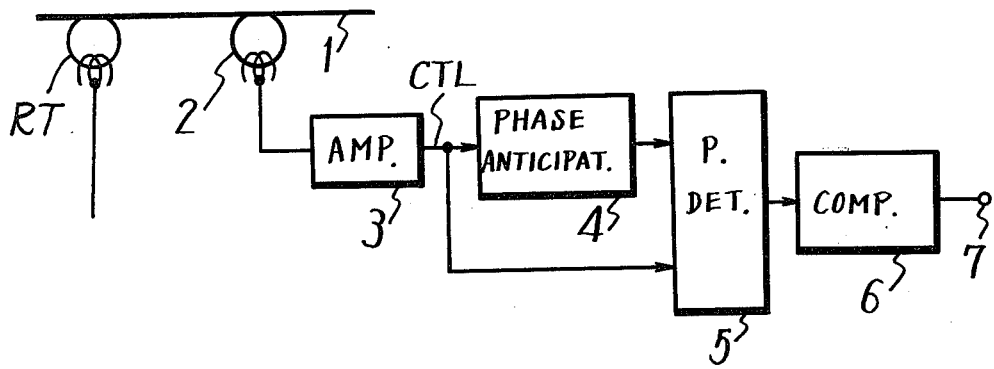
FIG. 1 is a simplified block diagram of this invention.

Referring to FIG. 1, it is appreciated that a magnetic medium, referred to herein as a magnetic tape 1 has a periodic control (CTL) signal recorded thereon. In addition information signals, such as PCM signals, analog signals, or the like, also are recorded on the tape for playback by an information reproducing transducer RT. Tape 1 is moved at a constant speed relative to a magnetic transducer, or head, 2 so that such head operates to reproduce the recorded periodic control signal (CTL). The reproduced control signal is applied to an amplifier 3, whereat it is amplified and then supplied to a phase-anticipating circuit 4. This phase-anticipating circuit is adapted to generate an anticipative output signal which has a known phase relationship to previously reproduced control signals. That is, the anticipative signal exhibits an anticipated phase relationship to the expected control signal reproduced from the magnetic tape, provided that the phase of the control signal remains substantially constant.

The outputs of phase-anticipating circuit 4 and amplifier 3 both are coupled to a phase-detector circuit 5, which is adapted to detect the phase relationship between the actually reproduced control signal and the anticipative signal. The output of the phase-detecting circuit indicates if the phase of the reproduced control signal has deviated relative to the phase of the anticipative signal, and this output is supplied to a comparator 6, which produces an indication at its output terminal 7 if the detected phase deviation exceeds a predetermined amount. Comparator 6 thus is adapted to distinguish large phase changes in the reproduced control signal, which large phase changes are attributed to splicing points, from relatively small phase changes which may be attributed to time-base variations.

Figure 2:
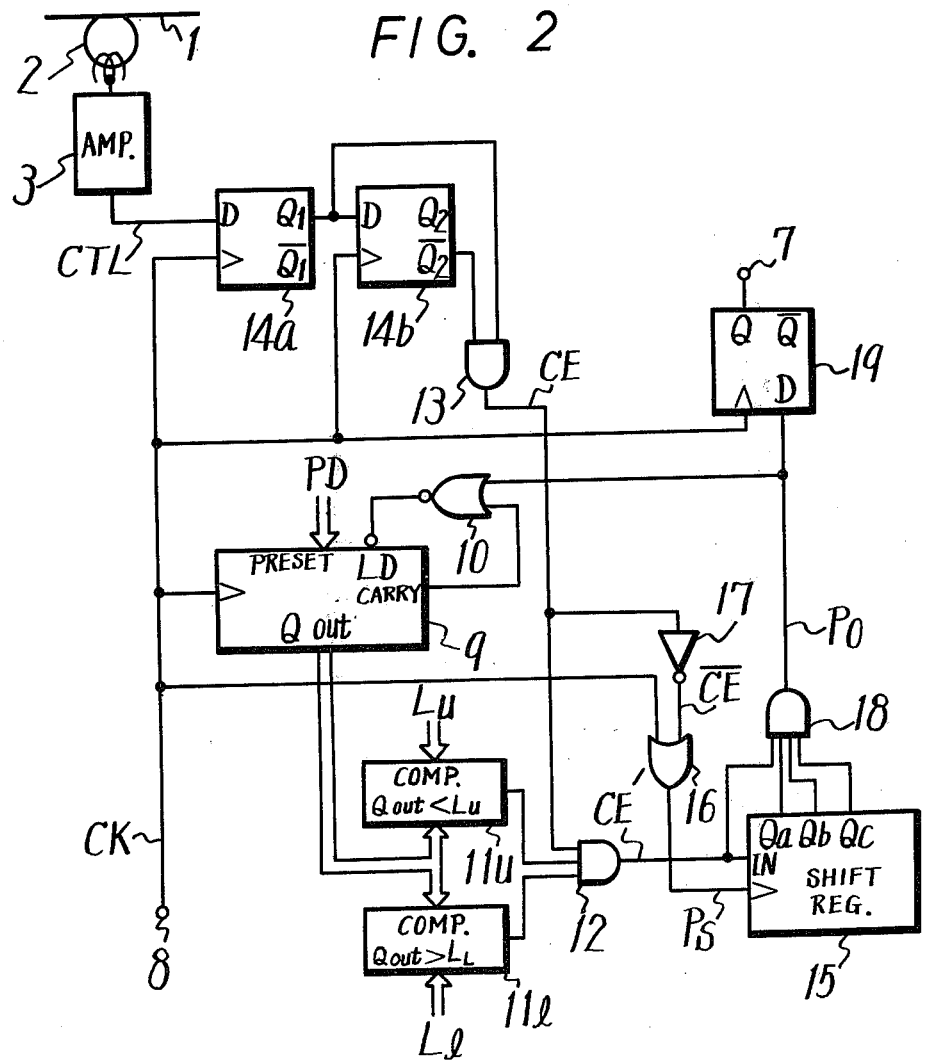
FIG. 2 is a logic diagram of one embodiment of this invention.

Referring now to FIG. 2, a logic diagram of one embodiment of the present invention is illustrated. Like reference numerals are used in FIG. 2 to identify those elements which have been discussed above in conjunction with FIG. 1. For the purpose of the present description; it is assumed that control signal CTL is recorded in the longitudinal direction of tape 1, and exhibits a rectangular waveform of fixed frequency. For example, if the magnetic tape is transported at a constant speed, the frequency of the reproduced control signal CTL may be on the order of about 1.8 KHz.

During normal operation of the tape reproducing device with which the present invention is used, the reproduced control signal is supplied to a capstan servo circuit (not shown), to control the movement of the magnetic tape so that its transport speed, and thus the frequency of the reproduced control signal, are substantially constant. Preferably, magnetic head 2, which also can be used for recording the control signals, is disposed prior to or upstream of the audio information reproducing transducer RT, so that a splicing point is detected before that splicing point reaches the information reproducing transducer. Hence, there will be time for an error correction operation to be carried out to prevent erroneously reproduced signals (due to the splicing point) from being included in the output of the reproducing device.

Clock signal pulses CK, having a frequency much higher than that of the reproduced control signal, are supplied from a suitable source (not shown) to a terminal 8.

These clock pulses are applied to the clock input of a resettable counter 9, whereat they are counted by the counter, causing the count value thereof to increase until a predetermined value is attained, whereupon the counter emits a carry signal. This signal is fed back through a NOR gate 10 to the load input LD of counter 9, thereby loading the counter with a preset count value PD supplied from a suitable source. As a result, the count value of counter 9 cyclically varies from an initial value, corresponding to the preset count value PD, to a maximum value, whereupon the carry signal is emitted. The frequency of the clock pulses CK, the preset count value PD and the maximum value are selected such that counter 9 repeats its counting cycle at a frequency equal to the frequency of the reproduced control signal CTL. For example, if the reproduced control signal has a frequency of 1.8 KHz, the period of the counting cycle of counter 9 is equal to 1/1.8 m sec.

The instantaneous count of counter 9 is supplied as a multi-bit parallel output $Q_{out}$ to the inputs of respective comparators $11_u$ and $11_l$. Comparator $11_u$ also is supplied with an upper limit count value $L_u$, corresponding to an upper limit threshold value less than the maximum count value of counter 9. Comparator $11_l$ also is supplied with a lower limit count value $L_l$ corresponding to a lower limit threshold value greater than the preset count value PD. When the output $Q_{out}$ of counter 9 is less than the upper limit threshold value $L_u$, the output of comparator $11_u$ is equal to a binary "1". When the output $Q_{out}$ exceeds the value $L_u$, the output of the comparator $11_u$ is a binary "0". Conversely, when the output $Q_{out}$ of counter 9 exceeds the lower limit threshold value $L_l$, the output of comparator $11_l$ is equal to a binary "1", and when the output $Q_{out}$ is less than the value $L_l$, the output of comparator $11_l$ is a binary "0".

Turning to FIG. 3A, the output $Q_{out}$ of counter 9 is represented as the analog equivalent thereof, and it is seen that this output increase with time from the preset count value PD to the maximum count value in the form of a sawtooth waveform. FIG. 3A also shows the relationship between the output count $Q_{out}$ and the upper and lower limit threshold values $L_u$ and $L_l$, respectively. During the period $t_0$, shown in FIG. 3A, the output count $Q_{out}$ is within a range that first is greater than the upper limit threshold value $L_u$ and then is less than the lower limit threshold value $L_l$, with the result that during the period $t_0$, first the output of comparator $11_u$ and then the output of comparator $11_l$ is equal to a binary "0". During the period $t_1$, the count values of the output count $Q_{out}$ are always greater than the lower limit threshold value $L_l$ and are always less than the upper limit threshold value $L_u$, so that the outputs of comparators $11_u$ and $11_l$ both are binary "1".

The outputs of the comparators $11_u$ and $11_l$ are supplied to respective inputs of an AND gate 12. An additional input of the AND gate is supplied with an edge pulse CE (FIG. 3C) which is produced in timed synchronism with the leading edge of each control pulse (CTL-FIG. 3B) reproduced by magnetic head 2. The edge pulse is of a predetermined duration and is generated by a pulse generator comprised of D-type flip-flop circuits 14a and 14b and and AND gate 13.

Referring to FIGS. 4A-4F, clock pulses CK, shown in FIG. 4A are supplied to the clock inputs of flip-flop circuits 14a and 14b. The reproduced control signal CTL, shown in FIG. 4B, is supplied by magnetic head 2 through amplifier 3 to the D input of flip-flop 14a. As shown in FIG. 4C, the $Q_1$ output of flip-flop circuit $14_a$ assumes the same state as the control signal CTL in response to the positive transition of the clock pulse CK. Thus, the $Q_1$ output of this flip-flop circuit follows the control signal CTL, but is slightly delayed therefrom, so as to be in synchronism with the clock pulse CK. The $Q_1$ output of flip-flop circuit 14a is coupled to the D input of flip-flop circuit 14b and also to a first input of AND gate 13. The clock input of flip-flop circuit 14b is coupled to terminal 8 to receive the clock pulses CK and, as a result, this flip-flop circuit is triggered by the positive transition of the clock pulses to the state assumed by flip-flop circuit 14a. As shown in FIG. 4D the $Q_2$ output of flip-flop circuit 14b follows the $Q_1$ output of flip-flop circuit 14a and is delayed in phase by one cycle of the clock pulse CK. The output $\overline{Q_2}$ of flip-flop circuit 14b, shown in FIG. 4E, is complementary to the $Q_2$ output, and is supplied to a second input of AND gate 13. As can be seen from FIG. 4F, the output of AND gate 13 is at its binary "1" level only during the brief period that both the $Q_1$ and $\overline{Q_2}$ outputs are a binary "1", that is, shortly after the leading edge of the reproduced control signal.

As has been stated above, AND gate 12 receives the outputs of comparators $11_u$ and $11_l$, as well as the edge pulse CE produced by AND gate 13. AND gate 12 thus produces a phase change indicating signal CE', shown in FIG. 3D, only if the leading edge of a reproduced control signal CTL occurs during the period $t_1$. As will be explained below, however, the operation of counter 9 normally is synchronized with the reproduced control signal so that the leading edge of the control signal normally occurs during the period $t_0$, except when a splicing point is detected. As long as the phase of the reproduced control signal remains substantially constant, the edge pulse CE will occur during the period $t_0$ and, thus, the phase change indicating signal CE' will not be generated. The period $t_0$, which is a function of the upper limit threshold value $L_u$ and the lower limit threshold value $L_l$, is sufficiently large so that phase changes in the reproduced control signal due to timebase variations nevertheless will result in the occurrence of the edge pulse CE within period $t_0$. However, if a significant phase change occurs between two adjacent control pulses, such as the phase shift shown by the period $T_j$ of FIG. 3B, the edge pulse CE occurs during the period $t_1$ and AND gate 12 produces the phase change indicating signal CE'; shown in FIG. 3D.

The phase change indicating signal CE' is supplied to the input terminal of a shift register 15 from AND gate 12. Shift register 15 includes a shift pulse input connected to receive periodic shift pulses $P_s$, shown in FIG. 4H, produced by an OR gate 16 in response to the edge pulses CE. One input of the OR gate is coupled to clock pulse input terminal 8 to receive clock pulses CK, and the other input thereof is coupled to the output of AND gate 13 through an inverter 17, to receive an inverted edge pulse $\overline{CE}$, shown in FIG. 4G. OR gate 16 produces a shift pulse $P_s$ which, as shown in FIG. 4H, normally is at a binary "1" level except when both the clock pulse CK and the inverted edge pulse $\overline{CE}$ are at the binary "0" level. As a result, each time that edge pulse CE is generated, a shift pulse $P_s$ is produced to load the then-existing state of the phase change indicating signal CE' into shift register 15.

The first, second and third output stages $Q_a$, $Q_b$, and $Q_c$ of shift register 15 are connected to respective inputs of an AND gate 18. The output of the AND gate 12 also is connected to another input of AND gate 18. AND gate 18 is adapted to produce a splicing point detection pulse $P_0$, shown in FIG. 3E, only when three successive phase change indicating signals CE' are produced in response to three successively reproduced control pulses. By requiring three successive phase change indicating signals CE' for the production of the splicing point detection pulse $P_0$, the possibility of a false detection pulse $P_0$ due to time base errors, noise or other errors in the reproduced control signal is minimized. Of course, if desired, any other number of successive phase-change indicating signals may be detected before a splicing point detection pulse is produced. In addition, it should be noted that if one or more control pulses are not reproduced, such as because of drop-out or electronic malfunction, a faulty indication of a splicing point will be prevented. A phase change indicating signal CE' is not generated and cannot be shifted into shift register 15 during a period in which control pulses are not reproduced, since the edge pulse CE, from which the phase change indicating signal CE' and shift pulse $P_s$ are derived, cannot be generated in the absence of reproduced control pulses.

The splicing point detection pulse $P_0$ is supplied through a delay flip-flop circuit 19 to an output terminal 7. The delay flip-flop circuit synchronizes the splicing point detection pulse $P_o$ with the clock pulses CK. From terminal 7, the splicing point detection pulse $P_0$ is supplied to circuitry known in the prior art for preventing erroneously reproduced signals in the vicinity of the splicing point from being produced at the output of the tape reproducing device with which the present invention is used. The splicing point detection pulse $P_o$ is also supplied to another input of NOR gate 10 to load counter 9 with the preset count value PD. Hence, the cyclical counting of counter 9 is phase-adjusted to restore the proper phase relationship with the reproduced control pulses, as shown in FIG. 3A. As a result, each successive edge pulse CE now derived from the reproduced control pulses occurs in phase with the period $t_0$, until another splicing point is detected.

When operation of the apparatus shown in FIG. 2 commences, it is likely that one or more splicing point detection pulses $P_0$ will be generated independently of whether or not a splicing point actually exists upon tape 1. This results from the fact that when operation commences there is an undefined phase relationship between the operation of counter 9 and the control signal reproduced from the tape. It also may result from the fact that, when the tape reproducing device first starts up, tape 1 may not be moving at its proper speed, so that the control pulses reproduced by magnetic head 2 will not have the same period as counter 9. Therefore, it is recommended that the apparatus of FIG. 2 be used in conjunction with a device which inhibits, or mutes, the output of terminal 7 until tape 1 reaches its standard speed. At that time, counter 9 will automatically exhibit the proper phase relationship with the control pulses reproduced from tape 1 by reason of the resetting of the counter to its initial preset count in response to the pulses $P_0$ of AND gate 18.

It can be seen that the present invention provides a simple, inexpensive techniques for detecting one or a rapid succession of splicing points on a magnetic medium. Furthermore, there is a strong likelihood that false indications of a splicing point due to such factors as time-base variation, drop out or noise, will be avoided.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for detecting a splicing point in a magnetic medium having information signals recorded thereon and on which a sequence of normally periodic control signals has been recorded separate from said information signals, comprising:
    reproducing transducer means for reproducing said information signals;
    pickup means apart from said reproducing transducer means for reproducing said sequence of control signals from said magnetic medium;
    phase detecting means for comparing the phase of each successively reproduced control signal in said sequence with the phase of at least a previously reproduced control signal and for indicating changes in the phase of said reproduced control signals; and
    means responsive to said phase detecting means for producing a splicing point indication in response to a change of at least a predetermined amount in the phase of a successive predetermined number of said reproduced control signals, as indicated by said phase detecting means.

2. Apparatus for detecting a splicing point in a magnetic medium having information signals recorded thereon and on which a sequence of normally periodic control signals has been recorded separate from said information signals, comprising:
    reproducing transducer means for reproducing said information signals;
    pickup means apart from said reproducing transducer means for reproducing said sequence of control signals from said magnetic medium;
    means for generating a periodic anticipative signal having an anticipated phase relationship in respect to expected control signals reproduced from said magnetic medium; and
    means for detecting the phase relationship of actually reproduced control signals in respect to said anticipative signals and for indicating a splicing point when said detected phase relationship deviates from said anticipated phase relationship by at least a predetermined amount for a successive predetermined number of said reproduced control signals.

3. Apparatus according to claim 1; in which the magnetic medium is a magnetic tape on which said control signals are periodic so long as said tape is transported at a constant speed, and said pickup means is spaced upstream from said reproducing transducer means considered with reference to the direction in which the tape is transported.

4. Apparatus for detecting a splicing point in a magnetic medium having information signals recorded thereon and on which a sequence of normally periodic control signals has been recorded separate from said information signals, comprising:
    reproducing transducer means for reproducing said information signals;
    pickup means apart from said reproducing transducer means for reproducing said sequence of control signals from said magnetic medium at a normally periodic frequency;
    first signal generating means responsive to each of the successively reproduced control signals to generate a respective first signal in timed synchronism therewith;
    second signal generating means for generating second signals substantially at said periodic frequency and in a particular phase relationship to an expected reproduced control signal; and
    circuit means having an output and having inputs coupled to said first and second signal generating means for detecting the phase relationship between said first and second signals and for producing a splice indicating signal at said output thereof when said detected phase relationship differs from said particular phase relationship by a predetermined amount for a successive predetermined number of said reproduced control signals.

5. Apparatus according to claim 4, wherein said circuit means includes AND gate means.

6. Apparatus for detecting a splicing point in a magnetic medium on which a sequence of normally periodic control signals have been recorded, comprising:
    pickup means for reproducing said sequence of control signals from said magnetic medium at a normally periodic frequency;
    first signal generating means responsive to each successively reproduced control signal to generate a first signal in timed synchronism therewith;
    second signal generating means for generating second signals substantially at said periodic frequency and at a particular phase relationship with an expected reproduced control signal, including a source of clock pulse signals at a given clock frequency, resettable counter means for counting said clock pulse signals and for producing a count value which cyclically varies from an initial value to a maximum value at substantially said periodic frequency, and threshold means for supplying said second signals as a disabling signal when said count value of said counter means is within a certain range and for supplying said second signals as an enabling signal when said count value is outside said certain range; and
    circuit means including AND gate means having input means coupled to said first and second signal generating means and supplied with said first signal and said second signals and for producing a phase change indicating signal at an output thereof when said second signal is provided as said enabling signal corresponding to a condition wherein said detected phase relationship differs from said particular phase relationship by at least a predetermined amount.

7. The apparatus according to claim 6, wherein said count value produced by said counter means is reset to said initial value in response to said phase change indicating signal.

8. The apparatus according to claim 7, wherein said circuit means further includes shift register means connected to said output of said AND gate means for storing said phase change indicating signals; and means connected to said shift register means for indicating the detection of a splicing point in response to the storage of at least a predetermined number of phase change indicating signals produced in response to successive control signals.

9. The apparatus according to claim 8, wherein said reproduced control signals are rectangular pulse signals; and wherein said first signal generating means comprises pulse generating means supplied with said clock pulse signals and responsive to the leading edge of each reproduced control signal to generate a pulse of predetermined duration.

10. The apparatus of claim 9, further comprising shift pulse generating means for supplying periodic shift pulses to said shift register means in response to each pulse generated by said pulse generating means.

11. The apparatus of claim 7, wherein said threshold means comprises comparison means supplied with the count value of said counter means, and with preselected upper and lower count values, for producing said disabling signal when said count value of said counter means exceeds said preselected upper count value or is less than preselected lower count value.

12. A method of detecting a splicing point in a magnetic tape having information signals recorded thereon and on which a sequence of control signals has been recorded separate from said information signals so as to normally occur periodically when said tape is transported at a constant speed, comprising the steps of:
reproducing said information signals at a location along said tape as the latter is transported at said constant speed;
reproducing said sequence of control signals at a location which is upstream, considered with reference to the direction in which the tape is transported, in respect to said location at which the information signals are reproduced;
generating a periodic anticipative signal having an anticipated phase relationship with expected control signals reproduced from said magnetic tape;
detecting the phase relationship of actually reproduced control signals to said anticipative signals; and
indicating a splicing point when said detected phase relationship deviates from said anticipated phase relationship by at least a predetermined amount for a predetermined number of the actually reproduced control signals.

13. The method of claim 12, further comprising the step of adjusting the phase of said anticipative signal so as to exhibit said anticipated phase relationship in the event that a splicing point is indicated.

* * * * *